United States Patent
Preukschat et al.

(10) Patent No.: US 8,052,161 B2
(45) Date of Patent: Nov. 8, 2011

(54) WHEEL SUSPENSION FOR A MOTOR VEHICLE

(75) Inventors: Alfred Preukschat, Cologne (DE);
Thomas Brendecke, Peine (DE);
Luitpold Miller, Ottobrunn (DE);
Siegfried Ellmann, Aschheim (DE)

(73) Assignees: ThyssenKrupp Bilstein Suspension GmbH, Ennepetal (DE); ThyssenKrupp Presta München/Esslingen GmbH, München (DE)

( * ) Notice: Subject to any disclaimer, the term of this patent is extended or adjusted under 35 U.S.C. 154(b) by 61 days.

(21) Appl. No.: 12/002,621

(22) Filed: Dec. 18, 2007

(65) Prior Publication Data

US 2008/0150250 A1    Jun. 26, 2008

(30) Foreign Application Priority Data

Dec. 21, 2006   (DE) .................. 10 2006 061 984

(51) Int. Cl.
*B60G 11/18* (2006.01)
*B60G 11/20* (2006.01)
(52) U.S. Cl. .......... 280/124.167; 280/124.134; 267/285; 267/277; 267/278; 267/154
(58) Field of Classification Search ........... 280/124.167, 280/124.166, 124.134, 124.137, 124.149, 280/5.511, 684, 679, 124.13, FOR. 115, FOR. 152, 280/FOR. 157, FOR. 174, FOR. 178, FOR. 180; 180/9.58; 267/273, 285, 277, 278, 154; *B60G 11/18, 11/44, 11/50, 11/60, 11/64, B60G 11/20*
See application file for complete search history.

(56) References Cited

U.S. PATENT DOCUMENTS

| | | | | |
|---|---|---|---|---|
| 2,818,273 | A | * | 12/1957 | Weihsmann ............... 280/5.514 |
| 2,942,871 | A | * | 6/1960 | Kraus .......................... 267/273 |
| 4,781,364 | A | * | 11/1988 | Finn et al. .................... 267/260 |
| 2004/0046336 | A1 | * | 3/2004 | Jensen et al. ............... 280/5.511 |
| 2006/0273539 | A1 | * | 12/2006 | Barth et al. ............ 280/124.107 |

FOREIGN PATENT DOCUMENTS

| | | |
|---|---|---|
| DE | 38 31 338 | 4/1989 |
| DE | 39 28 062 | 11/1990 |

OTHER PUBLICATIONS

Kraftfahr-technisches Taschenbuch, Bosch, 2007, pp. 780-781.

* cited by examiner

*Primary Examiner* — Faye M Fleming
*Assistant Examiner* — Keith Frisby
(74) *Attorney, Agent, or Firm* — Collard & Roe, P.C.

(57) ABSTRACT

A wheel suspension for a motor vehicle has a transverse control arm that can be attached to a vehicle body by way of bearings and a spring-elastic torsion bar assembly, and can be rotated about a longitudinal axis. The torsion bar assembly has a body spring that can be attached to the vehicle body with one end, and a transverse control arm spring that is attached to the transverse control arm with one end. The body spring and the transverse control arm spring are coupled with one another at their free ends. The transverse control arm spring and the body spring are coupled with one another by way of a setting element or a releasable connection, whereby the setting element or the releasable connection, respectively, allows rotation of the ends assigned to one another, for setting purposes.

12 Claims, 4 Drawing Sheets

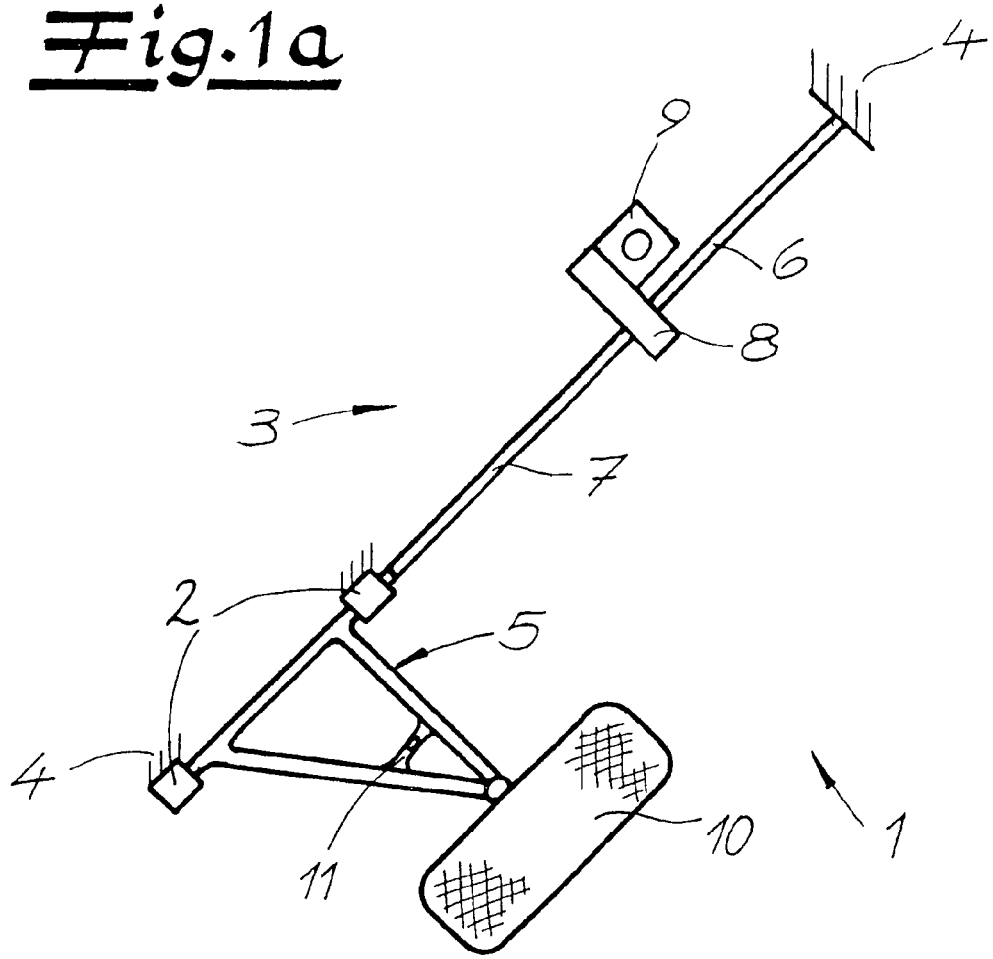
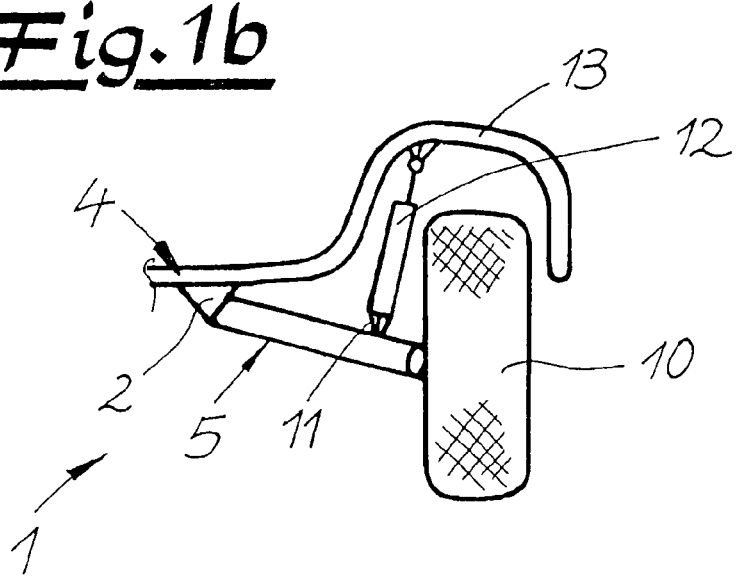

WHEEL SUSPENSION FOR A MOTOR VEHICLE

CROSS REFERENCE TO RELATED APPLICATIONS

Applicants claim priority under 35 U.S.C. §119 of German Application No. 10 2006 061 984.6 filed Dec. 21, 2006.

BACKGROUND OF THE INVENTION

1. Field of the Invention

The present invention relates to a wheel suspension for a motor vehicle, having a transverse control arm that can be attached to a vehicle body by way of bearings and a spring-elastic torsion bar assembly, and can be rotated about a longitudinal axis. The torsion bar assembly has a body spring that can be attached to the vehicle body with one end, and a transverse control arm spring that is attached to the transverse control arm with one end. The body spring and the transverse control arm spring are coupled with one another at their free ends. The wheel suspension is particularly provided as a single-wheel suspension, on at least one axle of a passenger car or a utility vehicle.

2. The Prior Art

A wheel suspension having the characteristics described initially is known from the reference DE 38 31 338 A1. Both the body spring and the transverse control arm spring are configured in tubular shape, as torsion bar springs, and are disposed coaxially, whereby the transverse control arm spring surrounds the body spring and whereby the torsion bar springs are rigidly connected at their free ends, by way of a coupling point.

At the opposite ends of the torsion bar springs, the body spring is connected with the vehicle body, and the transverse control arm spring is connected with the transverse control arm. A device that can be hydraulically activated is disposed between the coupling point and the transverse control arm, for adjusting the angle of rotation. This device makes it possible to actively adjust the spring force of the torsion bar assembly as a function of the driving situation. While the weight force that acts on the wheel suspension is essentially absorbed by the torsion bar assembly, the device for adjusting the angle of rotation makes it possible, proceeding from a normal position of the torsion rod assembly in the stressed state, to perform an active adjustment with comparatively small setting moments. In the force-free state of the device for adjusting the angle of rotation, the wheel height of a wheel attached to a vehicle with the wheel suspension is obtained, on the one hand, from the weight force that acts on the wheel suspension, and, on the other hand, from the spring-elastic properties of the torsion rod assembly.

SUMMARY OF THE INVENTION

It is an object of the invention to provide a wheel suspension for a motor vehicle, having the characteristics described initially, which can easily be adapted to different installation and stress situations.

These and other objects are achieved in accordance with the invention by providing a wheel suspension having the characteristics described initially, in which the transverse control arm spring and the body spring are coupled with one another by way of a setting element or a releasable connection, whereby the setting element or the releasable connection allows rotation of the ends assigned to one another, relative to one another, for setting purposes. The connection by way of the setting element or the releasable connection makes it possible, for example, to balance out production tolerances of the body spring and the transverse control arm spring. Rotation of the ends assigned to one another also makes it possible to adapt the torsion rod assembly to different stresses and to displace the design position, so that the wheel suspension can be adapted to different curb weights of different vehicle types, for example. In this connection, the design position refers to the wheel height that results when stress is placed on the wheel suspension, at a predetermined reference weight of the motor vehicle.

The transverse control arm spring and the body spring can be configured as a solid rod or as a tube, in each instance. In addition, the body spring or the transverse control arm spring or both may be composed of two or more torsion bar springs disposed parallel to one another. It is practical if the transverse control arm spring and the body spring are configured coaxially, in a series, or if at least one of the springs is configured in tubular shape, also disposed nested concentrically in one another. An embodiment in which the body spring and the transverse control arm spring are configured as tubular torsion bar springs that are disposed concentrically is particularly preferred. In the case of a concentric arrangement of body spring and transverse control arm spring, nested in one another, a particularly advantageous compact construction of the wheel suspension is possible, whereby fundamentally, the transverse control arm spring and the body spring can have different lengths.

Within the scope of the invention, the transverse control arm spring and the body spring can be directly coupled with one another by means of a releasable friction-force connection or a shape-fit connection. In this way, the transverse control arm spring and the body arm spring can directly be coupled with one another by way of a releasable clamp connection. The body spring and the transverse control arm spring may be configured as tubular torsion bar springs in a concentric arrangement. In this arrangement, the free end of the torsion bar spring that is disposed on the outside in the radial direction can have slots, for example, and be directly connected with the torsion bar spring that lies on the inside, by being jammed with a releasable clamp. In order to make a shape-fit connection between the transverse control arm spring and the body spring available, a connection part, for example in the form of a cuff, can be provided between the two springs. Alternatively, the transverse control arm spring and the body spring can be connected by way of a lockable gear wheel assembly as a setting element. Such a configuration, in particular, also allows structuring the setting element so that it can be activated hydraulically or electromagnetically, whereby the wheel height can be flexibly adapted to the requirements, in each instance, during operation of the motor vehicle.

In a preferred embodiment, an actuator, which can be connected to the vehicle body, for adjusting the angle of rotation of the torsion bar assembly is disposed at the ends of the transverse control arm spring and the body spring that are coupled with one another. The actuator is disposed parallel to the body spring with regard to the transfer of force from the transverse control arm to the vehicle body, and makes an adjustment of the spring force possible by means of a rotation of the torsion bar assembly.

In this connection, the actuator is preferably operated in such a manner that a large part of the force that acts statically on the wheel suspension is absorbed by the body spring that is disposed in parallel, so that the adjustment of the angle of rotation of the torsion bar assembly can take place with comparatively slight torques. The wheel height status of a wheel of the motor vehicle disposed on the transverse control arm can be kept constant, independent of the static forces that are in effect because of the weight stress of the wheel suspension and the dynamic forces that occur at the wheel suspension as the result of an uneven road surface or driving maneuvers, for example. Joint control of the actuators of the wheel suspensions on one or more axles of the motor vehicle particularly allows dynamic regulation of up-and-down and side-to-side movements, thereby making it possible to clearly increase driving safety.

In an alternative embodiment, an actuator for adjusting the angle of rotation of the torsion bar assembly is disposed on the ends of the transverse control arm spring and the body spring that are coupled with one another, on the one hand, and the transverse control arm, on the other hand. The actuator is disposed parallel to the transverse control arm spring and is preferably operated in such a manner that the static weight is essentially absorbed by the transverse control arm spring disposed in parallel. As described above, the actuator allows both static level regulation and dynamic regulation of up-and-down and side-to-side movements.

The actuator disposed parallel to the transverse control arm spring or body spring, with regard to the transfer of force, can be configured as a cylinder/piston assembly that can be hydraulically activated, or as an electromechanical actuator, for example, within the scope of the invention.

In the case of a cylinder/piston assembly that can be hydraulically activated as the actuator, this actuator typically has a telescope cylinder that is divided into two chambers by a setting piston disposed on a piston rod, which chambers can be connected to a hydraulic source by way of hydraulic lines and with the interposition of a controllable regulation and setting element.

When the actuator is an electromechanical actuator, the actuator can be controlled directly by a control and regulation device so that the actuator has a simple structure. Furthermore, in the case of a suitable configuration of the actuator, a high level of rigidity and thus a clearly defined adjustment of the angle of rotation of the torsion rod assembly can be made possible. The electromechanical actuator has a servomotor and preferably also a gear mechanism, in order to adapt the torque of the servomotor to the torque required for adjusting the angle of rotation of the torsion bar assembly.

Within the scope of the invention, the wheel suspension usually has a passive damping element and/or one that can be actively controlled, for damping vibrations. The damping element is preferably structured as a passive rotation damper that is disposed on the transverse control arm, the transverse control arm spring, or the free end of the body spring. The transverse control arm and/or the torsion bar assembly are connected with the vehicle body by way of the passive rotation damper, which can be formed from an elastomer material, for example. Alternatively, however, the damping element can also be structured as a piston damper, preferably as an actively controllable piston damper, which is disposed between the transverse control arm and the vehicle body, in practical manner. When using an actively controllable piston damper and an actuator for adjusting the angle of rotation of the torsion bar assembly, the spring properties can be changed via the actuator, and the damping properties can be changed via the actively controllable piston damper, independent of one another, in particularly advantageous manner. Fundamentally, combinations of different passive and/or active damping elements can also be used, within the scope of the invention.

The wheel suspension according to the invention can also have conventional spring elements such as helical springs or air springs, which contribute to absorbing the weight force that acts on the wheel suspension, in addition to the spring-elastic torsion bar assembly. An embodiment in which only the torsion bar assembly is provided for the spring effect is particularly preferred, because such a design is characterized by a low space requirement, whereby the construction space in the region of a wheel case, in particular, can be minimized by means of the elimination of a conventional suspension strut. In particular, the available width of a trunk space or engine space disposed above a vehicle axle can be increased by means of the elimination of suspension strut domes, in comparison with a conventional embodiment in which suspension struts are provided.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 1a is a top view of a wheel suspension for a motor vehicle, according to the invention;

FIG. 1b is a front view of the wheel suspension according to FIG. 1a;

FIG. 2b is a front view of the embodiment according to FIG. 2a;

FIG. 3 is a perspective view of the wheel suspension according to FIG. 2a;

FIG. 4b is a rear view of the vehicle axle according to FIG. 4a.

DETAILED DESCRIPTION OF PREFERRED EMBODIMENTS

Figure 2A:
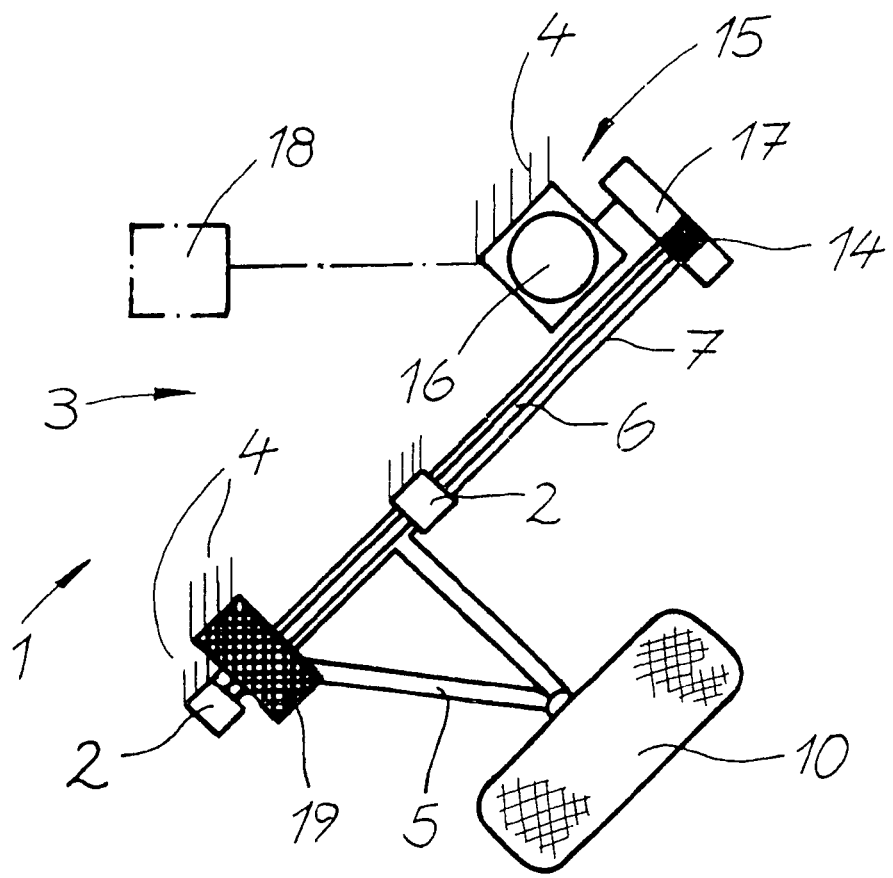
FIG. 2a is a top view of an alternative embodiment of a wheel suspension according to the invention.

Turning now in detail to the drawings, FIG. 1a shows a wheel suspension 1 for a motor vehicle, according to the invention. Wheel suspension 1 has a transverse control arm 5 that is attached to a vehicle body 4 by way of bearings 2 and a spring-elastic torsion bar assembly 3, and can be rotated about a longitudinal axis. Torsion bar assembly 3 has a body spring 6 and a transverse control arm spring 7, whereby body spring 6 is attached to vehicle body 4 with one end, and transverse control arm spring 7 is attached to transverse control arm 5 with one end. The free ends of transverse control arm spring 7 and body spring 6 are coupled by way of a gear mechanism 8 as a setting element, which allows rotation of the ends that are assigned to one another, for setting purposes. Gear mechanism 8 as a setting element can be driven by an electric motor 9 and can be locked in the desired setting position. Transverse control arm 5, on which a vehicle wheel 10 is disposed, has a connector 11 for a piston damper 12 or a conventional suspension strut.

FIG. 1b shows the assembly according to FIG. 1a in a view from the front. While the vehicle weight is supported by way of spring-elastic torsion bar assembly 3, vibration damping takes place by way of an actively controllable piston damper 12 as a damping element. Because placement of a conventional suspension strut is not provided in the embodiment shown, the space requirement of wheel suspension 1 is reduced in the region of wheel case 13, in advantageous manner.

Figure 3:
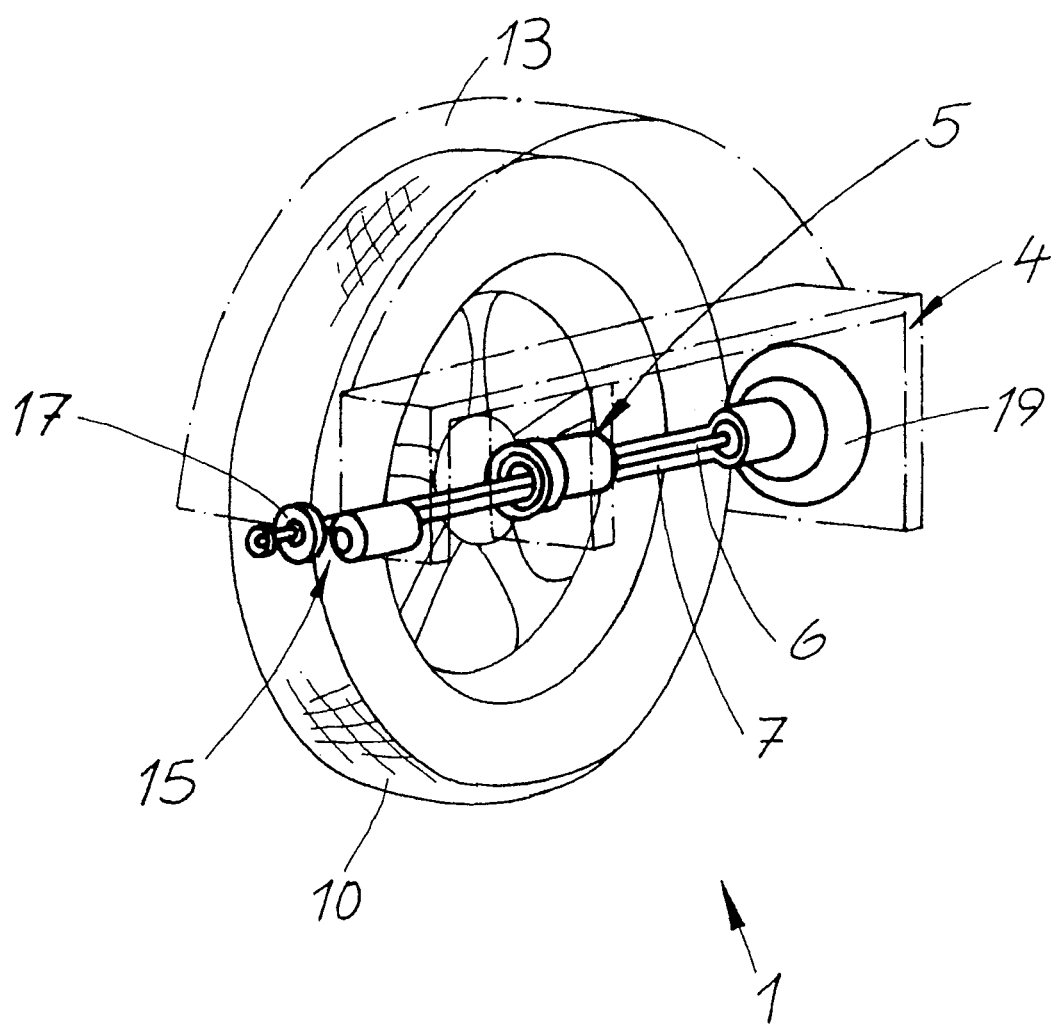

FIG. 2a and FIG. 3 show a particularly compact and space-saving embodiment of wheel suspension 1 according to the invention. Body spring 6 and transverse control arm spring 7 are configured as tubular torsion bar springs, and disposed concentrically, whereby body spring 6 is inserted into transverse control arm spring 7. Body spring 6 and transverse control arm spring 7 are coupled with one another, at their free ends, by way of a releasable connection 14, whereby connection 14 can be structured as a clamp connection, for example. An actuator 15 for adjusting the angle of rotation of torsion bar assembly 3 is attached to the ends of transverse control arm spring 7 and body spring 6 that are connected with one another. The electromechanical actuator 15 has a servomotor 16 that is attached to vehicle body 4, and a step-down gear mechanism 17. Actuator 15 is connected to a central control unit 18, both for static and dynamic level regulation and for dynamic regulation of up-and-down and side-to-side movements. A rotation damper 19, which can be formed from an elastomer plastic, for example, is provided as a passive damping element.

Figure 2B:
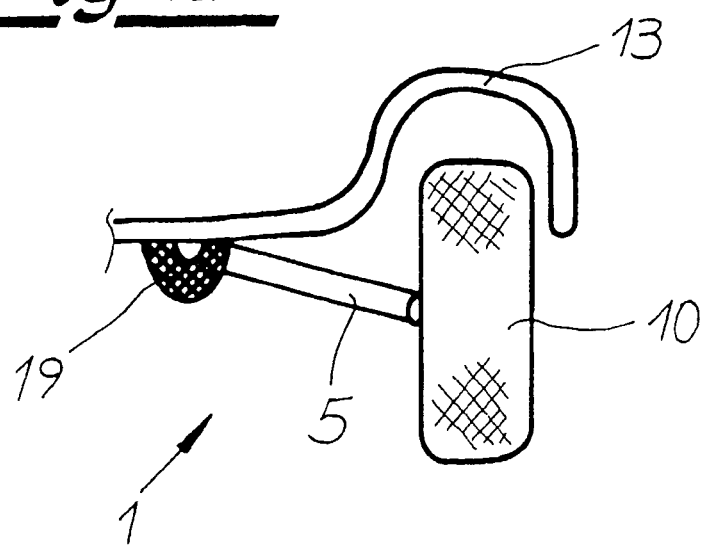

As can be seen in FIG. 2b, the space requirement of wheel suspension 1 is extremely slight, in comparison with a conventional suspension strut. Actuator 15 is attached between the ends of transverse control arm spring 7 and body spring 6 that are coupled with one another, on the one hand, and vehicle body 4, on the other hand, in the embodiment according to FIG. 2a. In an alternative embodiment of the invention, not shown, the actuator can also be disposed between the ends of transverse control arm spring 7 and body spring 6 that are coupled with one another, on the one hand, and transverse control arm 5, on the other hand, whereby the actuator is then disposed not parallel to body spring 6, as shown in FIG. 2a, but rather parallel to transverse control arm spring 7, with reference to the transfer of force from vehicle wheel 10 to vehicle body 4.

Figure 4A:
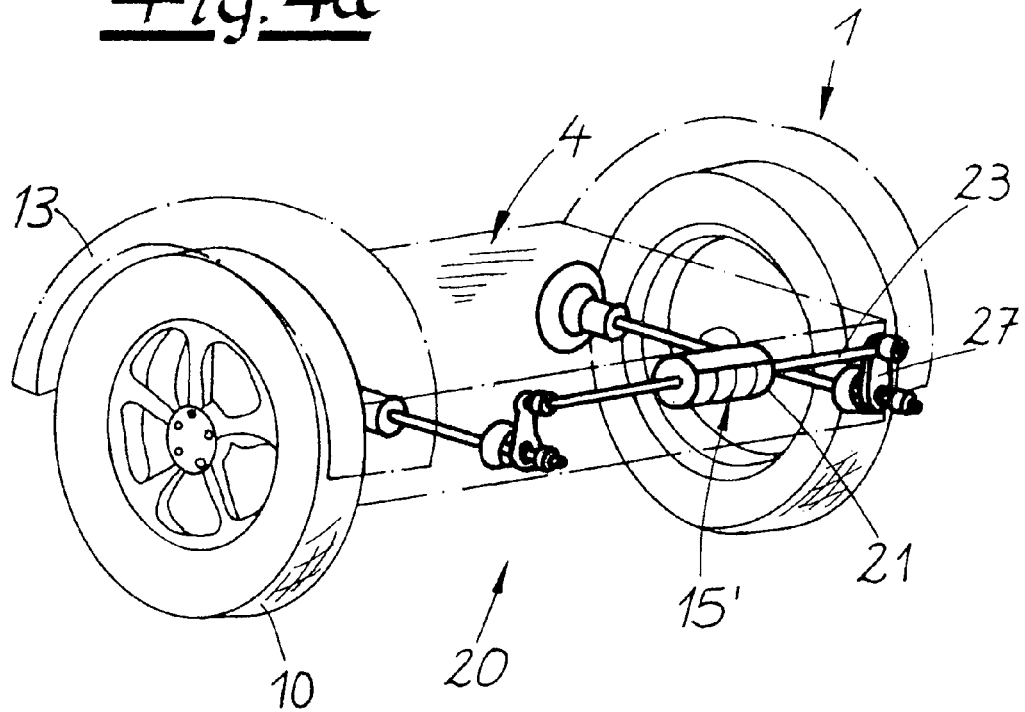
FIG. 4a is a perspective view of a vehicle axle with wheel suspensions according to the invention.
Figure 4B:
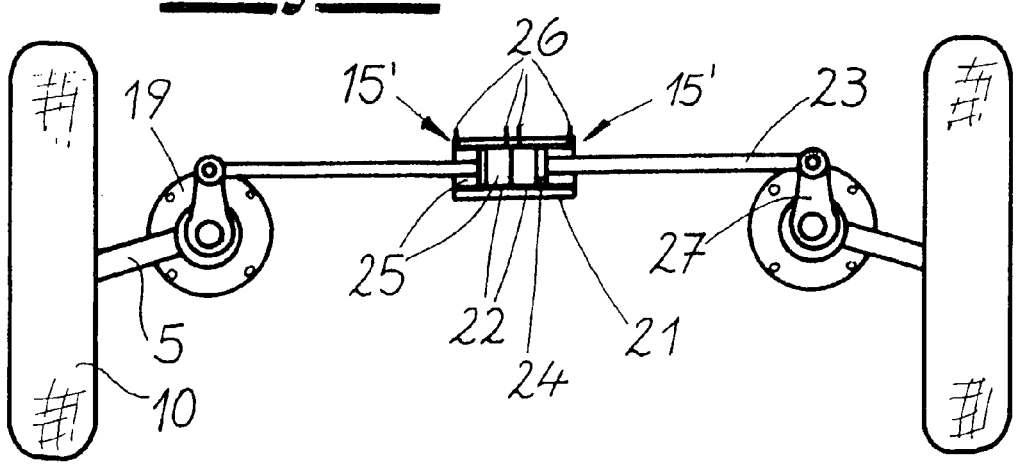

FIG. 4a shows a vehicle axle 20 having wheel suspensions 1 according to the invention. As in the embodiment according to FIG. 2a, body springs 6 and transverse control arm springs 7 are configured as tubular torsion bar springs, and disposed concentrically. A cylinder/piston assembly, which can be activated hydraulically, is provided as an actuator 15' between the ends of transverse control arm spring 7 and body spring 6 that are coupled with one another, on the one hand, and vehicle body 4, on the other hand, in the case of each of the two wheel suspensions 1. Hydraulic actuators 15' each have a telescope cylinder 22 in a common housing 21, in which cylinder a setting piston 24 attached to a piston rod 23 is disposed, so as to be displaceable. Setting piston 24 divides the related telescope cylinder 22 into two chambers 25, whereby each of chambers 25 has a hydraulic connector 26. The setting piston 24, with piston rod 23, can be displaced in telescope cylinder 22 by means of applying hydraulic fluid to chambers 25 in different manner. In this connection, piston rod 23 acts on the ends of transverse control arm spring 7 and body spring 6 that are connected with one another, by way of a lever arm 27. The cylinder/piston assembly that can be hydraulically activated is connected with a hydraulic system, not shown, having hydraulic lines, regulation and setting elements, and a hydraulic source, by way of hydraulic connectors 26. Body spring 6 and/or transverse control arm spring 7 can be composed of two or more torsion bar springs disposed in parallel, in each instance.

Although several embodiments of the present invention have been shown and described, it is to be understood that many changes and modifications may be made thereunto without departing from the spirit and scope of the invention as defined in the appended claims.

What is being claimed is:

1. A wheel suspension for a motor vehicle comprising
   (a) a spring-elastic torsion bar assembly comprising a body spring having first and second body spring ends, said first body spring end being attachable to a vehicle body via bearings, and a transverse control arm spring having first and second control arm spring ends;
   (b) a transverse control arm attached directly to the first control arm spring end, said transverse control arm being rotatable about a longitudinal axis and attachable via the bearings and the spring-elastic torsion bar assembly to the vehicle body; and
   (c) a coupling arrangement comprising a setting element or a releasable connection for coupling the transverse control arm spring with the body spring;
   wherein the second body spring end is coupled with the second control arm spring end via the coupling arrangement, the coupling arrangement allowing, in an assembled state, rotation of the second body spring end and the second control arm spring end relative to each other for setting purposes.

2. The wheel suspension according to claim 1, wherein the coupling arrangement is the setting element and comprises a lockable gear wheel assembly.

3. The wheel suspension according to claim 1, wherein the coupling arrangement is the setting element; and wherein the setting element can be activated hydraulically or electromechanically.

4. The wheel suspension according to claim 1, wherein the coupling arrangement is the releasable connection; and wherein the releasable connection is a releasable clamp connection.

5. The wheel suspension according to claim 1, further comprising an actuator disposed between the second control arm spring end and the second body spring end that are coupled with one another, on the one hand, and the transverse control arm, on the other hand, for adjusting an angle of rotation of the torsion bar assembly.

6. The wheel suspension according to claim 5, wherein the actuator comprises a hydraulically-activated cylinder/piston assembly.

7. The wheel suspension according to claim 5, wherein the actuator is an electromechanical actuator.

8. The wheel suspension according to claim 1, further comprising an actuator attachable to the vehicle body and disposed on the second control arm spring end and the second body spring end that are coupled with one another for adjusting an angle of rotation of the torsion bar assembly.

9. The wheel suspension according to claim 8, further comprising a control device connected to the actuator for active adjustment of a spring force.

10. The wheel suspension according to claim 1, further comprising a passive damping element or an actively controllable damping element.

11. The wheel suspension according to claim 1, wherein the body spring and the transverse control arm spring are configured as tubular torsion bar springs that are disposed concentrically.

12. The wheel suspension according to claim 1, wherein at least one of the body spring and the transverse control arm spring is composed of two or more torsion bar springs disposed in parallel.

* * * * *